(No Model.)
L. J. RICHARDS.
PACKING CASE FOR COFFEE, &c.
No. 420,736. Patented Feb. 4, 1890.
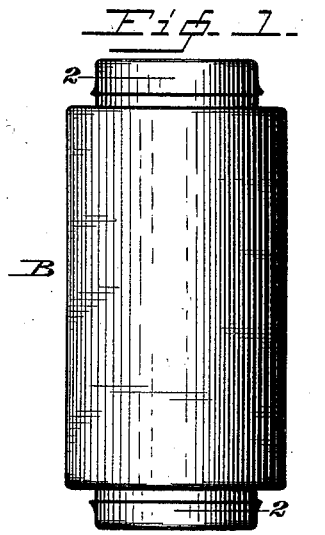
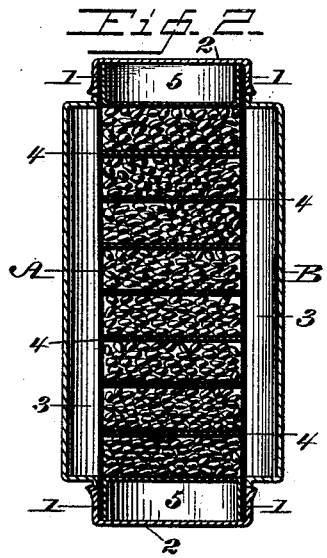
Witnesses
L. Douville,
A. P. Jennings.
Inventor
Lucius J. Richards.
By his Attorneys
Diedersheim & Kintner

UNITED STATES PATENT OFFICE.

LUCIUS J. RICHARDS, OF PHILADELPHIA, PENNSYLVANIA.

PACKING-CASE FOR COFFEE, &c.

SPECIFICATION forming part of Letters Patent No. 420,736, dated February 4, 1890.

Application filed January 17, 1889. Serial No. 296,642. (No model.)

*To all whom it may concern:*

Be it known that I, LUCIUS J. RICHARDS, a citizen of the United States, residing in the city and county of Philadelphia, State of Pennsylvania, have invented a new and useful Improvement in Packing-Cases for Coffee, &c., which improvement is fully set forth in the following specification and accompanying drawings.

My invention consists of a novel packing-case for coffee, &c., embodying, first, means for preventing the coffee from being deteriorated by the action of the atmosphere, and, next, means for dividing the coffee into predetermined quantities or rations.

Figure 1 represents a side elevation of a package for coffee embodying my invention. Fig. 2 represents a vertical section thereof.

Similar letters and numerals of reference indicate corresponding parts in the several figures.

Referring to the drawings, A designates a casing of cylindrical form, and B designates a jacket inclosing the same. The casing is of greater length than the jacket, as at 1, forming necks on which are fitted caps 2 2, whereby the casing is tightly closed. The jacket is of greater diameter than the casing, whereby a dead-air space 3 is left between said parts.

Within the casing at each end is a flanged disk $3^\times$, forming the dead-air spaces 5, as shown in Fig. 2.

When it is desired to fill the casing, the caps, disks, and partitions being removed, one of the flanged disks is placed within the casing and the cap at that end is secured thereon, a quantity of coffee, as may be determined upon, either ground or unground, is poured in, and a disk or partition 4, of paper or other suitable material, is placed thereon. Then more coffee is poured into the casing upon said disk or partition and another disk or partition placed thereon, and coffee and disks or partitions are alternately introduced into the casing until the latter is filled, after which a disk or partition is placed on top and the cap reapplied, it being seen that dead-air spaces 5 are left, respectively, between the top and bottom disks and the caps.

Owing to the spaces 3 and 5, the inner casing A is removed from direct contact with the atmosphere, whereby its contents are guarded from the injurious action of the atmosphere, more particularly moisture, and thus prevented from deterioration.

The partitions divide the coffee into rations, each of which may be removed as required, the same being of predetermined quantities relatively to the number of cups of beverage to be made, whereby the same may be of the proper strength.

Having thus described my invention, what I claim as new, and desire to secure by Letters Patent, is—

1. A vessel having a casing provided with a jacket, the casing projecting at each end beyond the jacket, caps mounted on the projecting ends of the casing, disks secured within the casing forming air-spaces between the same and the caps, and movable partitions adapted to rest on the inclosed material, said parts being combined substantially as described.

2. A packing-vessel consisting of a casing and a jacket having an air-chamber between them, the ends of the casing projecting beyond the jacket and having caps, disks secured within the casing at the ends thereof, and movable partitions adapted to rest on the inclosed material, substantially as described.

LUCIUS J. RICHARDS.

Witnesses:
 JOHN A. WIEDERSHEIM,
 JAMES F. KELLY.